US008117227B2

(12) United States Patent
Montangero et al.

(10) Patent No.: US 8,117,227 B2
(45) Date of Patent: Feb. 14, 2012

(54) METHOD FOR ANALYZING WEB SPACE DATA

(75) Inventors: Simone Montangero, Pisa (IT); Marco Furini, Melara (IT)

(73) Assignee: Scuola Normale Superiore Di Pisa, Pisa (IT)

( * ) Notice: Subject to any disclaimer, the term of this patent is extended or adjusted under 35 U.S.C. 154(b) by 230 days.

(21) Appl. No.: 12/635,004

(22) Filed: Dec. 10, 2009

(65) Prior Publication Data
US 2011/0145215 A1    Jun. 16, 2011

(51) Int. Cl.
  G06F 7/00    (2006.01)
  G06F 17/30    (2006.01)
(52) U.S. Cl. ........................... 707/769; 707/709
(58) Field of Classification Search .................. 707/769
  See application file for complete search history.

(56) References Cited

U.S. PATENT DOCUMENTS

| 2007/0100875 | A1* | 5/2007 | Chi et al. ............... 707/102 |
| 2008/0033587 | A1* | 2/2008 | Kurita et al. ............ 700/100 |
| 2010/0185641 | A1* | 7/2010 | Brazier et al. .......... 707/758 |

OTHER PUBLICATIONS

Yun Chi et al "Eigen-Trend: Trend Analysis in the Blogosphere Based on Singular Value Decompositions", NEC Laboratories America, 2006.
X. Ni et al "Exploring in the Weblog Space by Detecting Informative and Affective Articles" Dept. of Computer Science etc., May 2007, pp. 281-290.
Yang Liu et al "ARSA: A Sentiment-Aware Model for Predicting Sales Performance Using Blogs", Dept. of Computer Science etc., Jul. 2007.
T. Fukuhara et al "Analyzing Concerns of People Using Weblog Articles and Real World Temporal Data" Research Institute of Science and etc., May 2005.
N. S. Glance et al "BlogPulse: Automated Trend Discovery for Weblogs" Intelliseek Applied Research Center, May 2004.
D. Gruhl et al "How to Build a WebFountain: An Architecture for Very Large-scale Text Analytics", IBM Systems Journal, 2004, pp. 64-77.
D. Gruhl et al "Information Diffusion Through Blogspace", IBM Research, May 2004, pp. 491501.
S. Morinaga et al "Mining Product Reputations on the Web", NEC Corporation, 2007, pp. 341-349.
R. Agrawal "Mining Newsgroups Using Networks Arising From Social Behavior", IBM Almaden Research Center, Mar. 3, 2007, pp. 529-535.
A.S. Sachrajda et al "Fractal Conductance Fluctuations in a Soft-Wall Stadium and a Sinai Billiard", Inst. For Microstructural Sciences, 1984, pp. 1948-1951.

* cited by examiner

*Primary Examiner* — Apu Mofiz
*Assistant Examiner* — Mohammad Rahman
(74) *Attorney, Agent, or Firm* — Dennison, Schultz & MacDonald

(57) ABSTRACT

A method for analyzing data from the web that determine the importance that a chosen subject has in society, e.g., subject matter relating a concert, a scientific discovery, a football match, a person, a corporation, a brand, or a car, and analyze such data that can represent the entire society better than the known techniques. The method according to the invention can avoid malicious alterations and is able to measure and detect the temporal relations among all the web resources that talk about a particular topic or subject matter.

10 Claims, 7 Drawing Sheets

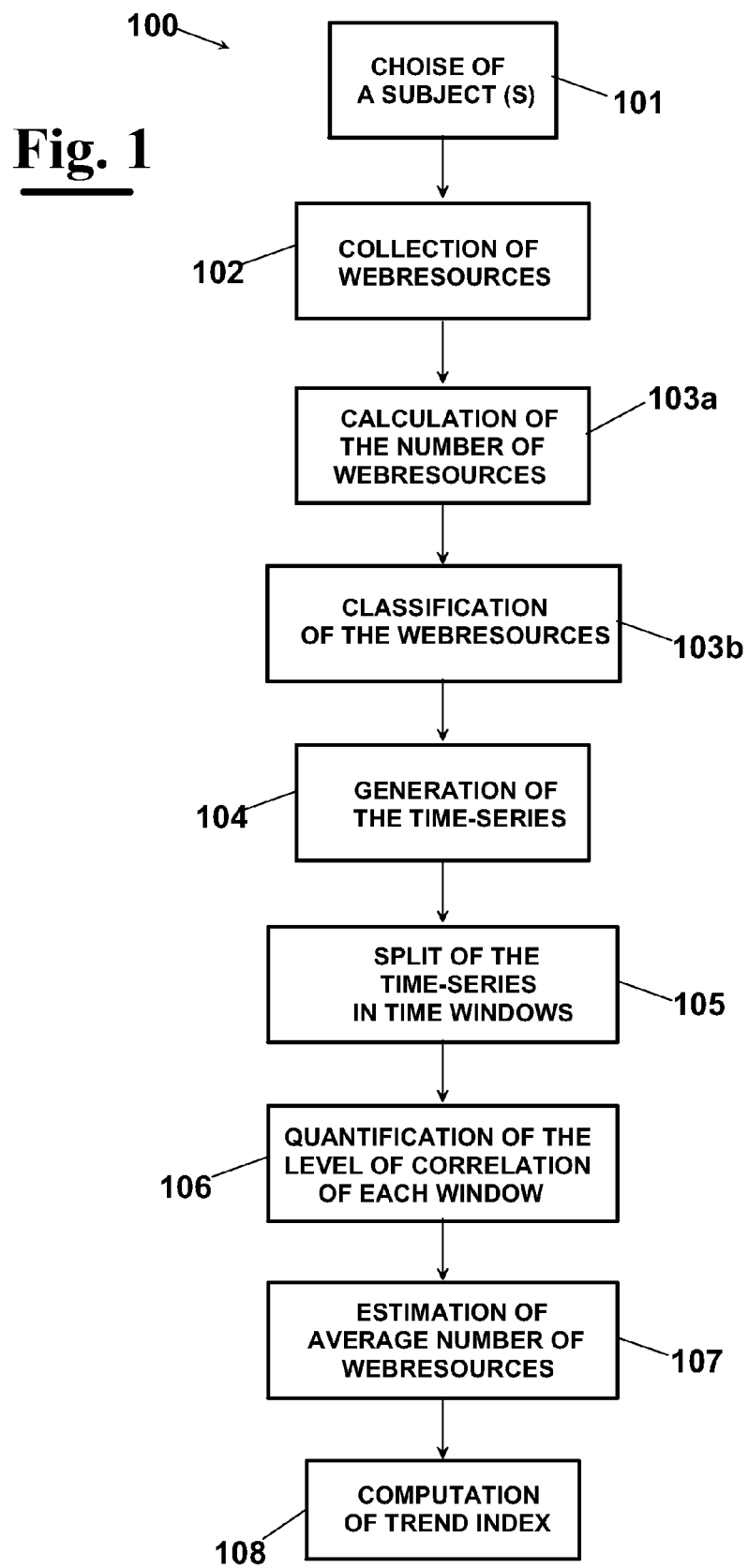

METHOD FOR ANALYZING WEB SPACE DATA

FIELD OF THE INVENTION

The present invention relates to a method for analyzing web space data, i.e. data from the internet Web, in order to find the society interests, in particular, for communication strategies, marketing analysis, business investment, sociological activities, product planning, or targeted advertising.

BACKGROUND OF THE INVENTION

As well known, understanding social concerns and opinions is of high importance in several scenarios and in many decision making processes. Nowadays, society thoughts are mainly investigated by conducting a series of questions to a selected sample of the population. Questions like. What do you think about that brand? Did you like the commercial aired during the superbowl? Do you watch that TV-show? Do you buy that product?, are commonly used by polling organizations to figure out the society opinions.

Recently, the widespread use of the Web as a way of conveying personal opinions has whetted researchers to propose methods that aim at understanding the society through Webspace analysis.

The rationale behind the usage of Web data to find the society interests is that, thanks to the set of Internet technologies grouped under the label Web 2.0, the Web is more and more a significant representation of our society: it is a modern version of the Ancient Greek Agora, where people gathered together to do commercial and administrative activities, to discuss politics and philosophy, to participate to social and religious events, to understand and influence society.

Web 2.0 technologies like blogs, podcasts, and wikis are so important in nowadays the society that they are affecting its morphology by creating new spaces of freedom, giving voice to any opinion, easing interpersonal relationships, and encouraging the creation of collaborating collectivities.

The revolution of Web 2.0 is that it potentially transforms every user from a mere passive reader to an active modern citizen, apart from ethnicity, gender, or walk of life. Using Web 2.0 technologies, people can meet virtually to share knowledge, conduct business, discuss different topics, socialize, and even influence society. The society and Web are so strongly linked that they affect each other. When something happens in the society it is very likely that few seconds later someone writes about it in the Webspace, for example, more and more people consider the Web as the first place to look for news, or when a product is released, the Blogosphere, which is made up of all the blogs and their interconnections, is the place where to discuss about it. On the other hand, the Web might influence the society providing several communication tools and an easy access to information. For instance, on May 2007 a post on a blog reported that Apple was delaying the "iPhone" and "Leopard OS". Although this post turned out to be a false alarm, during the period that the news was considered to be true, Apple's stocks were negatively affected.

In the literature, different proposals exploit the society-Web relation so as to find out society's interests like people' concerns, Hollywood stars' notoriety, politicians' popularity, or consumers' opinions. These proposals are based on the idea that when you see something interesting, e.g., on TV, on the Web, or at the movie theater, you usually converse about it with friends, and if people talk about it and spread the voice around, there will be several on-going conversations about the topic. The more people converse on a same subject matter, the more the topic is considered in society. By supposing the Blogosphere as the place where modern conversations happens, these methods compute the number of on-going discussions about a specific topic and uses this number as an indication of the importance of the topic in society.

Also commercial products like Google Trends, BlogPulse, Trendpedia, and Blogmeter, just to name a few, exploit the Webspace to analyze human society. These tools assume that the more people use Web search engines to look for a particular topic, or the more people discuss a particular topic in the Blogosphere, the more the topic is popular, important, or simply discussed in society.

A critical thinking to these approaches is that they may help understanding what's going on in the Web, but they might be misleading or might even represent a distorted view of the society. Two are the main concerns about these methods.

Firstly, results better represent a part and not the entire society. In fact, being based on the Blogosphere, these methods analyze a portion of the society composed of tens of millions of users who share information and exchange personal opinions, a portion of the society usually defined as composed of technologically advanced people. With no doubt, the Blogosphere offers great commercial values and provides new business opportunities in areas such as product survey, customer relationship, and marketing, but compared to the 700 millions of Web users, the Blogosphere represents a very small portion of the Web, and therefore of the society.

The second critical note is related to the usage of the sole magnitude of volume data search in Web search engines, or of keywords in the Blogosphere; it is easy to maliciously alter the results as one can write a software that automatically, and periodically, issues Web searches, or posts blog messages, so as to make a brand, a website, or a politician more popular than they really are.

Recently, in the literature many proposals focused on using Web data to understand social opinions and/or concerns, as well as many commercial blog sites and Web search engines introduced services that try to give an indication of public opinions.

In the literature, much research work is being conducted on the Blogosphere, as blogs are much more dynamic than traditional Web pages:

Chi et al. analyze the Blogosphere and propose a trend analysis technique based on the singular value decomposition.

Ni et al. propose a machine learning method for classifying informative and affective articles inside the Blogosphere.

Liu et al. study the predictive power of opinions and sentiments expressed in blogs, in order to predict product sales performance.

Fukuhara et al. describe a system that counts the number of blog articles containing a specific word so as to understand concerns of people.

Glance et al. propose a mechanism to discover trends inside the Blogosphere by using data mining techniques.

Gruhl et al. use the volume of blogs or link structures to predict the trend of product sales.

Morinaga et al. present an approach that automatically mines consumer opinions with respect to given products, in order to facilitate customer relationship management.

Agrawal et al. and Gamon et al. have also conducted research in opinion mining for marketing purposes.

Also commercial blog sites and Web search engines are offering services that aim at understanding the society through Web data analysis.

The Webfountain project uses Web mining techniques for market intelligence and is based on massive server clusters;

Google Trends charts how often a particular search term is entered relative the total search volume across various regions of the world, and in various languages.

All the known methods based on the simple magnitude of the results, either in the Blogosphere, Web searches engines, or the entire Webspace, are misleading and provide different, and sometimes controversial, understandings of the society.

SUMMARY OF THE INVENTION

It is therefore a feature of the present invention to provide a method for analyzing data from the web that can find out the importance that a "subject" has in society, e.g., a subject matter relating to concert, a scientific discovery, a football match, a person, a corporation, a brand, a car.

It is also a feature of the present invention to provide a method for analyzing data from the web that can represent the entire society better than the known techniques.

It is another feature of the present invention to provide a method for analyzing data from the web that can avoid malicious alterations.

It is a particular feature of the present invention to provide a method for analyzing data from the web that is able to measure and detect the temporal relations among all the Web resources that talk about a particular topic or subject matter.

These and other features are accomplished with a generally computer-based method, according to the invention, for analyzing data from the web comprising the steps of:
  choosing a determined subject or topic (S), said topic (S) being identified by at least one keyword;
  collecting data, or Web resources, from the Web that mention said determined topic (S) at successive instants t, two successive instants t being separated by an interval of time of determined length d;
  counting the number W(S) of said Web resources that mention said determined topic (S) at each instant t;
  generating a time-series of consecutive measures of the number of said Web resources, said time-series representing said number W(S) of Web resources as a function of time;
  splitting said time-series into a plurality of consecutive time windows of determined length z, with z≧d in such a way that each time window comprises at least one web resource among said web resources;
  applying a determined technique to said plurality of time windows for quantifying, for at least one time window among said time windows, the level of correlations Lc existing in the Web resources W(S) of a same time window T and/or to characterize the structure of a so defined signal;
  estimating, for each time window, the average number $W_M(S)$ of said Web resources W(S) that mention said topic (S);
  computing, for each time window, a trend index by combining said average number of said Web resources $W_M(S)$ with said level of correlations Lc;
  repeating said computing step of said trend index for all said time windows generating a sequence of trend indexes which show how opinions that the society has on a topic S changed over time.

After said step of counting the number W(S) of said Web resources a step of classifying the web resources by means of the space locations can be also provided. In particular, the step of classifying the web resources can be carried out by means of an IP address, the last page update, or any other property that can be identified by means of a "selection rule" (translated in a "regular expression" in software), also associated to web 2.0 properties (such being part of blog, a given community, etc.) and to semantic web properties (semantic web).

In particular, the "level of correlation" is the quantity of cross-correlation of a signal with itself. The mathematical tools to compute cross-correlations may be developed, for example, to find repeating patterns, such as the presence of a periodic signal which has been buried under noise.

Advantageously, said determined technique applied to said plurality of time windows can be selected from the group comprised of:
  Fractal analysis;
  Fourier transform;
  Wavelet analysis;
  Entropy analysis.

In particular, said determined technique applied to said plurality of time windows is an Entropy analysis.

Preferably, said determined technique applied to said plurality of time windows is Fractal analysis. In this case, each of said level of correlations of each time window is expressed in terms of a Fractal dimension D.

Advantageously, after said step of applying a determined technique to said plurality of time windows, a step of post-processing the resulting data is also provided.

In particular, the above described method detects and measures the temporal relations among the Web resources and uses Fractal analysis to retrieve the correlations among the Web resources. The results obtained from applying fractal analysis are combined with the number of Web documents in order to compute an Index, i.e. the Trend Index, that aims to give an indication of the interest that the society has on a specific topic.

In particular, the computing step comprises a step of associating to said average number of said Web resources $W_M(S)$ and to said fractal dimension D a different weight, said associating step carried out selecting a parameter a in the range comprises between 0 and 1 depending on the importance to assign to said averaged number of Web resources $W_M(S)$ and to said fractal dimension D respectively.

Advantageously, the estimating step of said average number of Web resources of a determined time window is carried out applying the following equation:

$$W_M^i(S) = \sum \frac{W_j^i(S)}{|Ti|} \tag{I}$$

where Ti is the $i^{th}$ time window, $W_M^i(S)$ the average number of Web resources $W_j^i(S)$ in the $i^{th}$ time window, and Ti is the length of the $i^{th}$ time window.

Advantageously, the computing step of said trend index is carried out applying the following equation:

$$\text{Trend}_i^z(S) = \alpha \cdot \log W_M^i(S) + (1-\alpha) \cdot D_i(S) \tag{II}$$

where $D_i(S)$ is the fractal dimension of the $i^{th}$ time window and α is a parameter comprised in the range between 0 and 1.

In particular, the collecting step of data from the Web and said counting step of said number of Web resources W(S) are automatically carried out by a computer program, or web crawler, which browses the Web at said intervals of time of length d.

Advantageously, the computing step of said fractal dimension D comprises the steps of:
  covering the curve of said time-series of data with a grid of square boxes of a determined side (L);
  recording the number M(L) of boxes needed to cover said curve as a function of said box;

computing said fractal dimension D applying the following equation:

$$D = -\lim_{L \to 0} \log_L M(L) \qquad (III)$$

In particular, the fractal dimension D is comprised in the range between 1 and 2, said fractal dimension D being equal to 1 when the Web resources of a same interval time window create a regular system, while D being equal to 2 when the Web resources of a same interval of time create a random system.

In particular, two consecutive windows of said plurality of windows are partially overlapped.

Advantageously, the determined length z is comprised in the range between 12 hours and 60 days.

BRIEF DESCRIPTION OF THE DRAWINGS

The invention will be now shown with the following description of an exemplary embodiment thereof, exemplifying but not limitative, with reference to the attached drawings in which:

FIG. 1 shows a flowchart with the main steps of the method, according to the invention, for analyzing data from the web;

Figure 2A:
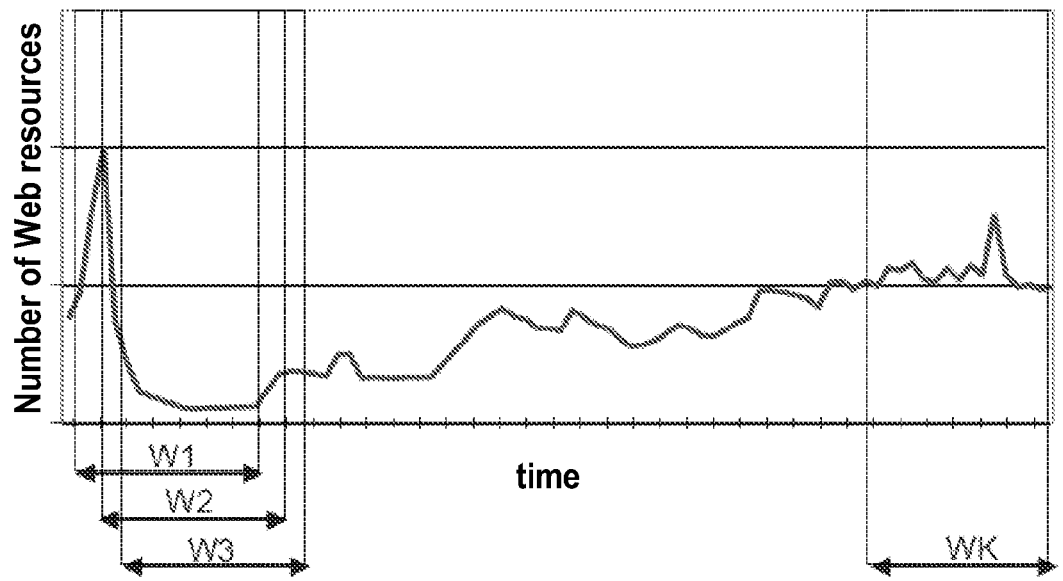
Figure 2B:
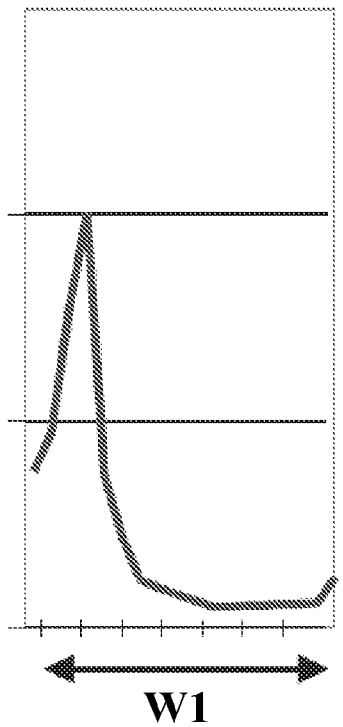
Figure 2C:
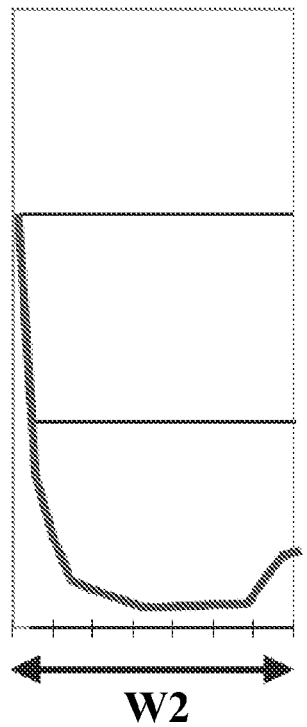
Figure 2D:
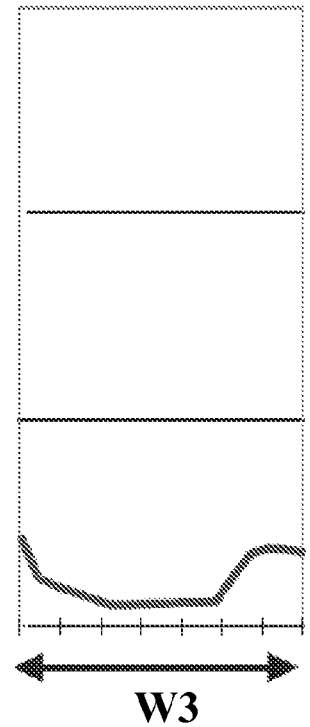
Figure 3:
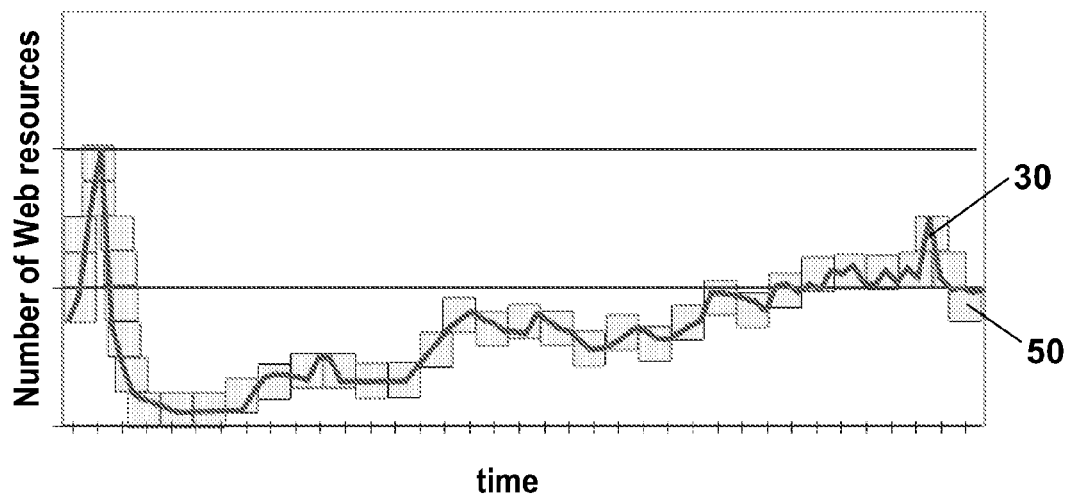
Figure 4:
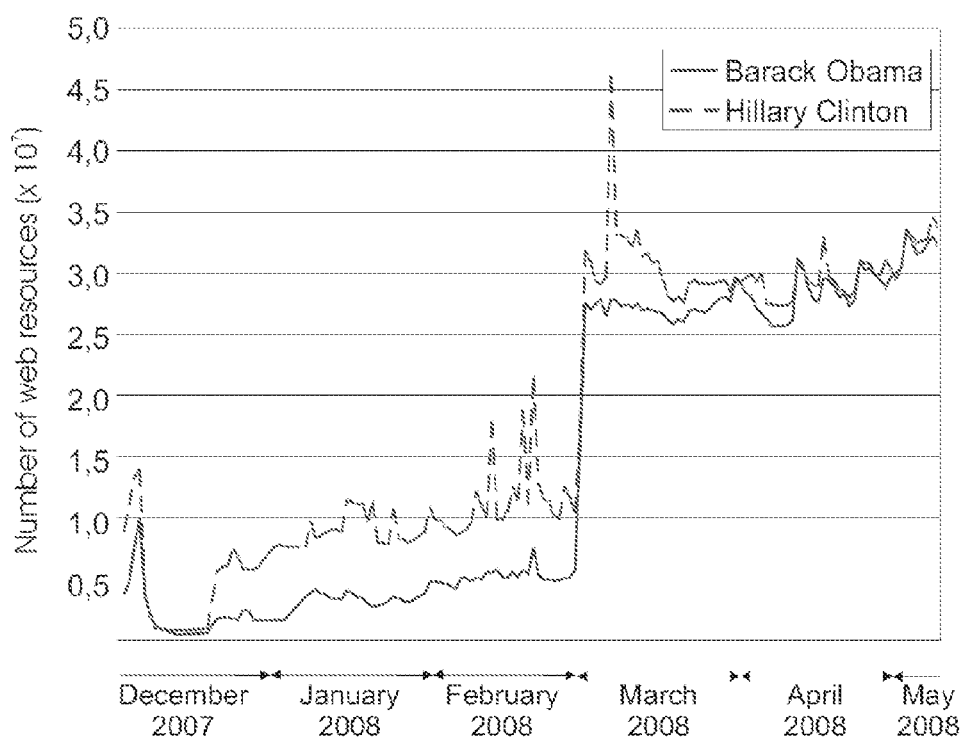
Figure 5:
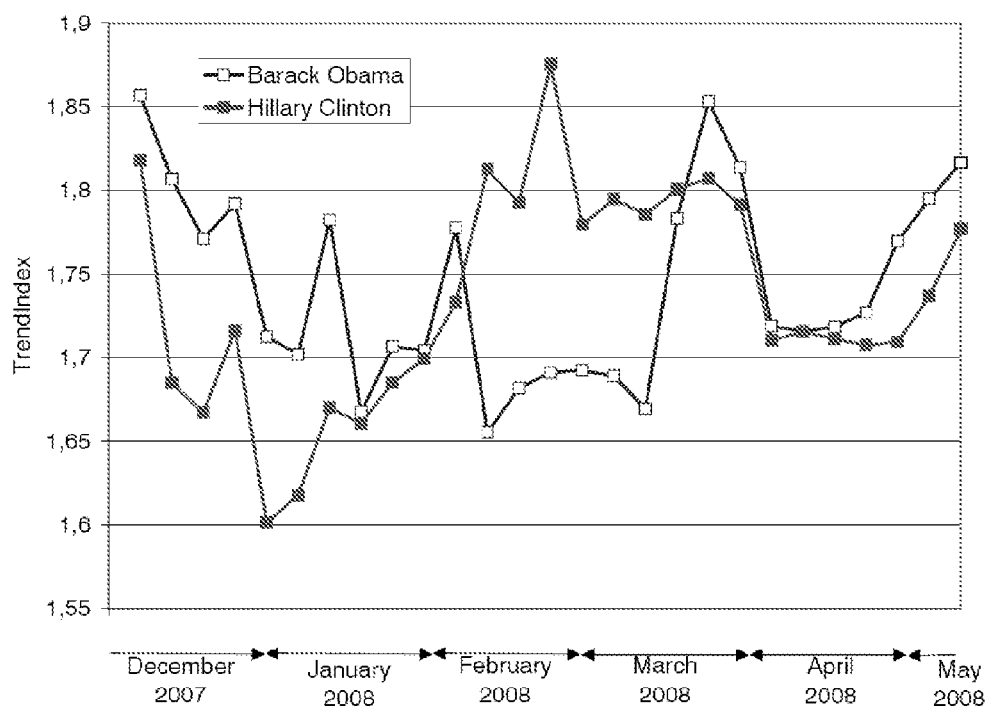
Figure 6:
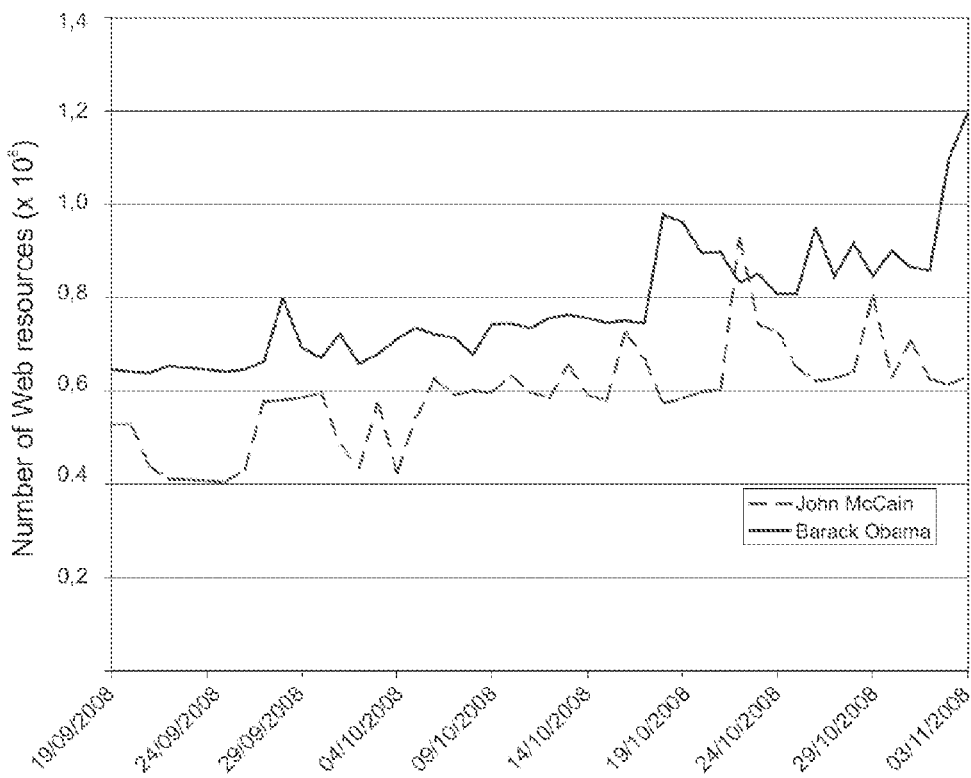
Figure 7:
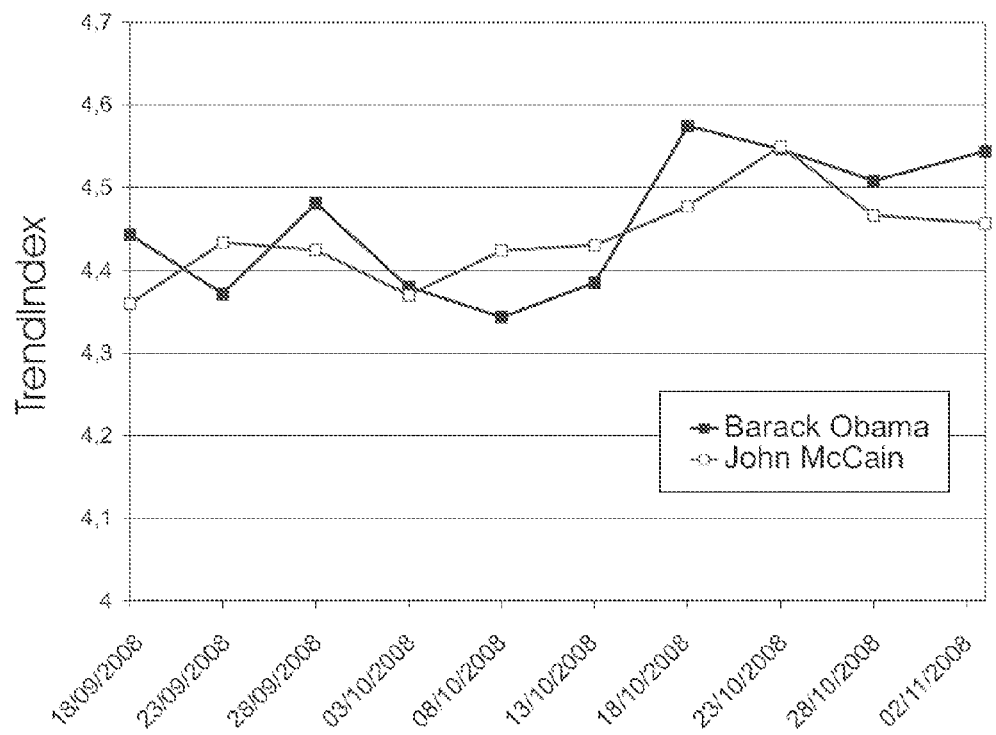
Figure 8:
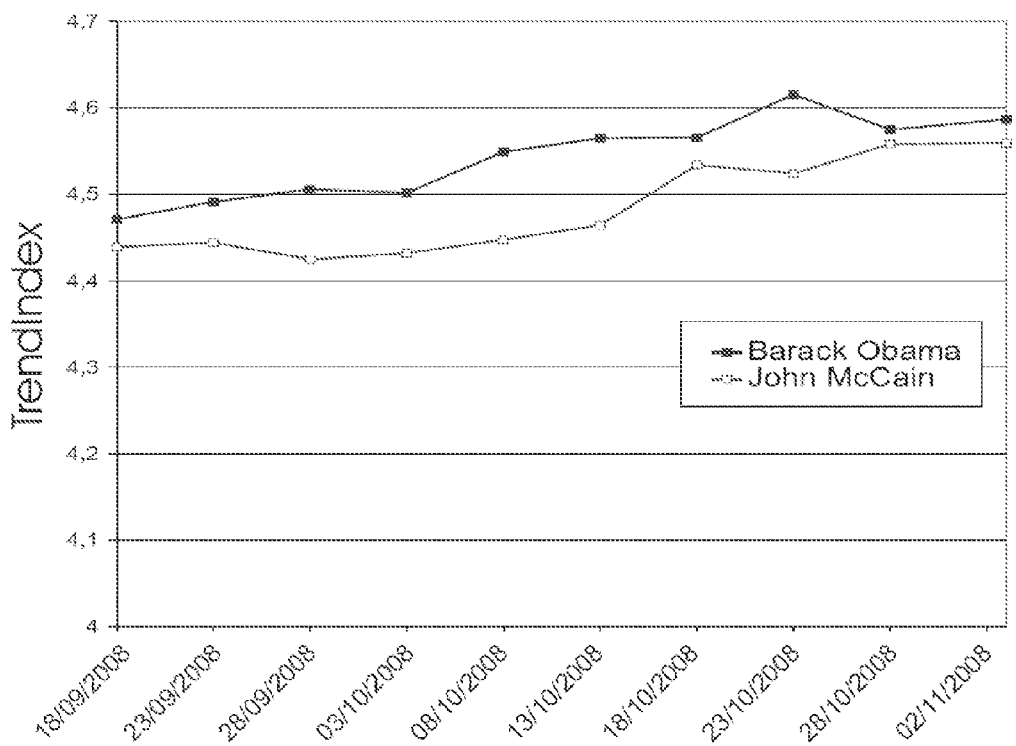
Figure 9:
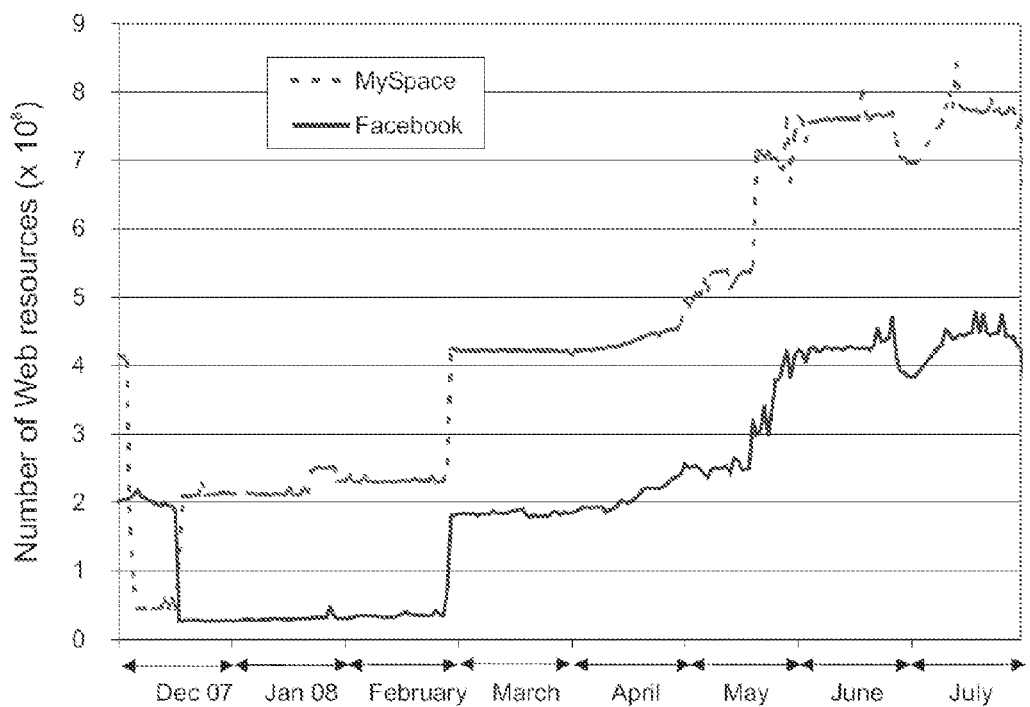
Figure 10:
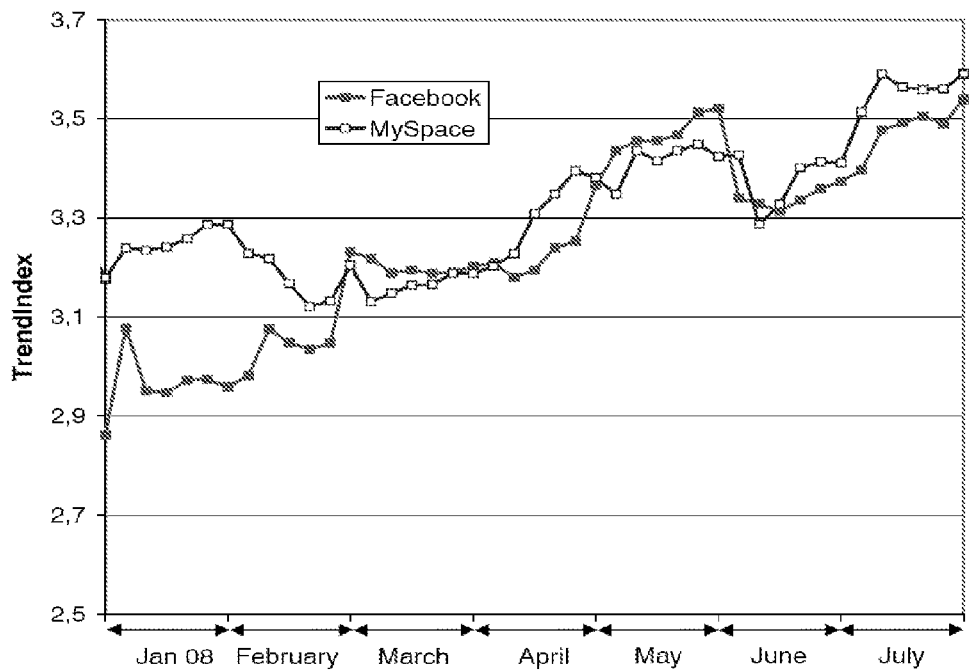
Figure 11:
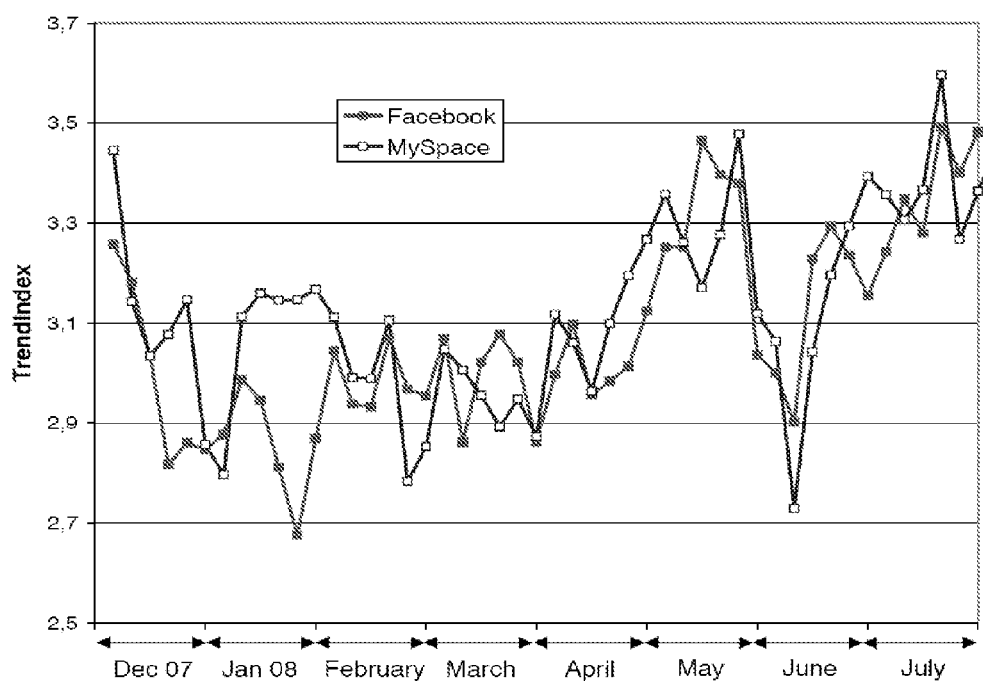

FIGS. from 2A to 2D diagrammatically show the step, as it is provided by the method illustrated in FIG. 1, of splitting the time-series of Web resources related to a determined topic into several overlapping and consecutive windows;

FIG. 3 diagrammatically shows a technique that can be applied for carrying out the step of computing the fractal dimension D of the Web resources;

FIG. 4 shows a diagram reporting the number of Web resources talking about the Democratic candidates Barack Obama and Hillary Clinton collected from December 2007 and May 2008;

FIG. 5 shows a diagram reporting the trend index, hereinafter also called TrendIndex, as it is computed by the method, according to the invention, on the basis of the Web resources shown in FIG. 4;

FIG. 6 shows a diagram reporting the number of Web resources talking about the candidates Barack Obama and John Mc Cain collected from September 2008 to November 2008;

FIGS. 7 and 8 show two diagrams reporting the TrendIndex computed by the method, according to the invention, on the basis of the Web resources shown in FIG. 6 for two different time-windows;

FIG. 9 shows a diagram reporting the number of Web resources talking about My Space and Facebook collected from December 2007 to July 2008;

FIG. 10 shows a diagram reporting the TrendIndex computed by the method, according to the invention, on the basis of the Web resources shown in FIG. 9 for a time window of 30 days;

FIG. 11 shows a diagram reporting the TrendIndex related to "MySpace" and "Facebook", with a time window of 7 days and α=0.5.

DESCRIPTION OF PREFERRED EXEMPLARY EMBODIMENTS

FIG. 1 shows the main steps of the method, according to the invention, for understanding the society through web data analysis.

The method starts with the choice of a determined topic (S), identified by one or more keywords, block 101.

A collecting step, block 102, is then provided at successive instants t for collecting data, or Web resources, mentioning the topic (S) from the Web. In particular, two successive instants t are separated by an interval of time of determined length.

A counting step is also provided for counting the number of Web resources W(S) that mention the topic (S) at each instant t, block 103a. After the step of counting the number W(S) a step of classifying the web resources by means of the space locations can be also provided, block 103b. In particular, the step of classifying the web resources can be carried out by means of an IP address, the last page update, or any other property that can be identified by means of a "selection rule" (translated into a "regular expression" in software), also associated to web 2.0 properties (such being part of blog, a given community, etc.) and to semantic web properties (semantic web).

Then a time-series of N consecutive periodic measures of the number of Web resources is generated, block 104. In particular, the time-series represents the average number W(S) of Web resources as a function of time.

The time-series is successively split into a plurality of consecutive time windows of determined length z, block 105. In particular, the length z of each time window is bigger than the length of the intervals of time between two successive instants at which the web resources are collected and counted in order to have at least one web resource within each time window. In a preferred embodiment of the invention, the collecting and counting steps of the Web resources are carried out by a Web crawler, i.e. a computer program that automatically browses the Web at each instant t.

A determined technique is then applied to each time window of the time-series in order to compute, for each of them, a corresponding level of correlations Lc, block 106.

For example if the technique applied to each time window is Fractal analysis the level of correlations is expressed in terms of a fractal dimension D. In particular, the fractal dimension D indicates the level of correlation existing in the Web resources W(S) of a same time window. The value of the fractal dimension D is comprised in the range between 1 and 2. More in detail, the value D of the fractal dimension is equal to 1 when the Web resources of a same interval time window corresponds to a regular system, while D is equal to 2 when the Web resources of a same time window corresponds to a random system. If the Web resources of a same time window are correlated then the value of the fractal dimension D is equal to 1.5. An example of regular system is represented by a single blogger who posts different messages about the same topic. Although, the number of Web resources talking about the topic smoothly increases, this increasing number does not reflect a growing of interest in topic by society. It simply represents a blogger who is very interested in the topic. An example of a random system is represented by several Web resources without any correlations that talk about the same topic (e.g., people who post messages about the same topic but do not relate each other).

To compute the fractal dimension D it is possible to use the box counting algorithm as disclosed in "*Fractal conductance fluctuations in a soft wall stadium and a sinai billiard*" Phys. Rev. Lett., 80:1948, 1998 in the name of A. S. Sachrajda et al. As illustrated in FIG. 3, the fractal dimension D of a signal is obtained by covering the curve of data 30 with a grid of square boxes 50 of size $L^2$. The number M(L) of boxes needed to cover the curve is recorded as a function of the box size L.

The fractal dimension D of the curve is then defined as:

$$D = -\lim_{L \to 0} \log_L M(L) \qquad (III)$$

If the value of D, as calculated with the equation, is equal to 1, then the curve is a straight line, as it is in the case of a regular system, whereas if D is equal to 2 the curve is a random curve. Indeed, eventually a random curve covers uniformly the whole plane. Any given value of D between these integer values is a signal of the fractality of the curve.

In another embodiment of the invention, the fractal dimension D is calculated by applying a different technique which uses rectangular boxes of size $L \times \Delta i$, where $\Delta i$ is the largest excursion of the curve in the region L.

Then, the number $$M(L) = \frac{\sum \Delta_i}{L}$$

is computed.

For any curve a region exists of box lengths Lmin<L<Lmax. Outside of this region either D=1 or D=2. The first equality (D=1) holds for L<Lmin and is due to the coarse grain artificially introduced by any discrete time series. The second equality (D=2) is obtained for L>Lmax and is due to the finite length of the analyzed time series.

The boundaries Lmin, Lmax have to be chosen properly for any time series. Unfortunately, the selection of Lmin, Lmax is prone to errors since non optimal boundaries may be selected.

However, as reported in the experimental results, this error does not really affect the computation of the TrendIndex. The fractal dimension represents the temporal correlation of a sequence of given values. To better appreciate how this temporal correlation changes with time, the method, according to the present invention, considers the N collected samples of the time-series ΓWeb(S) as several overlapping and consecutive time windows of length z (e.g., in our experiments we consider z equal to 7 and 30 days).

Once the fractal dimension D has been calculated, a step of estimation of the average number $W_M(S)$ of the Web resources is provided. This step is carried out for estimating the average number of the Web resources of a same time window, block 107.

Therefore, the fractal dimension of each time window is combined with the average number $W_M(S)$ of the Web resources of the same time-window for computing a Trend Index, block 108. The iteration of the latter step for all the time windows produces a sequence of trend indexes which show how opinions that the society has on a topic S has changed over time.

Fractal Analysis has been extensively employed in diverse scientific, sociological, and philosophical areas of research, and is used to describe physical, visual, acoustic, and chemical processes, and biological, weather, and financial systems. The importance of Fractal Analysis is that, given a sequence of values related to different time points (i.e., a time-series), it gives a fast insight of the "system" that generated the sequence of values.

In many scenarios, the knowledge of the "system" brings considerable benefits: for instance, it may be useful to predict the near future behaviour of earthquakes, or the stock market trend. The computation of the fractal dimension of a time-series allows discerning whether the system that generated the sequence is regular or random. Roughly, a regular system produces smooth changes in the sequence of values, whereas a random system produces highly irregular changes in the sequence. In our scenario, the sequence of values is the time-series ΓWeb(S) and the system is composed by all the Web resources that talk about topic S in the Webspace. We regard as appropriate to consider temporal correlations among Web resources of fundamental importance. In fact, the Web is a time evolving scenario where the number of Web resources talking about a topic is different from time to time, and the more these Web resources are temporarily correlated, the more the topic reflects an interest of the society.

In particular, correlations that survive long enough are likely to create a network of Web resources. If this happens, the network will likely respond to subsequent stimuli (new events related to the topic) in a similar "correlated" way. Conversely, if the network is not sufficiently correlated, it will eventually vanish and disappear, and the response to subsequent stimuli will be negligible. By applying Fractal Analysis and by computing the Fractal Dimension D, it is possible to have an insight of the amount of correlations present in the network of Web resources, i.e. whether the system is regular, random, or something in between, as anticipated above.

The present technique starts from the concept that anything between a regular and a random system means that the network of Web resources that generated the sequence is correlated and thus it will likely cause other people to become part of the network. As a result, more parts of the society are interested in the topic. To better clarify, let us consider a simple example: the success of a TV-series. An ensemble of fans can be triggered by the pilot episode so as to form a group of people interested in the TV-series. In this case, the group of fans is a correlated network as they talk almost every day about the TV-series. In fact, when a new episode is aired this group of fans will easily be the first to talk about it, and it is likely that they will cause other people to become fans; this means that the network grows, as additional people become part of the network.

Hereafter three examples are illustrated of application of the method, according to the invention, for analyzing the society through web data. In particular, three well-known scenarios are presented: the 2008 USA primary elections, the 2008 USA Presidential elections, and MySpace vs Facebook.

In the following examples, Fractal analysis has been applied to a plurality of time windows for quantifying the level of correlations existing in the Web resources. The level of correlations Lc existing in the Web resources W(S) of a same time window is, therefore, expressed as a fractal Dimension D computed using the equation (III) above indicated. In particular, it has been chosen a value of the parameter $\alpha=0.5$ which corresponds to a weight of the importance of the correlations as much as one order of magnitude in the number of web resources. A possible reasonable choice is that if comparing two different topics, one appears more than ten times more than the other ones, it should be recorded in any case as more influential. That is, during direct comparisons the correlations play a role only if the two topics have the same order of Web resources. Other choices of the value of α are of course possible.

The TrendIndex is computed using the equation (II) above indicated: $\text{Trend}_i^z(S) = \alpha \cdot \log W_M^i(S) + (1-\alpha) \cdot D_i(S)$.

Example 1

Web resources talking about US Presidential candidates have been collected from the second week of December 2007 to the second week of May 2008. FIG. 4 reports the number of Web resources talking about the Democratic candidates Barack Obama and Hillary Clinton. The number of Web resources has been detected every hour.

At first look, many more Web resources talked about Hillary Clinton (only since the beginning of April, the two candidates had a comparable number of Web resources). It can also be noted the presence of peaks. By analyzing where these peaks happen, it can be noted that both candidates have peaks around primary election contests. Also, it is interesting to note that the number of Web resources increased a lot at the beginning of March. A reasonable explanation is that at the beginning of March, the candidate John McCain got the Republican nomination, and hence all the media attentions began focusing mainly on the Democratic party.

Practically speaking, looking at this chart, Hillary Clinton should have won all the primary election contests, but she did not. An interesting analysis can be done by analyzing the volume of Web searches or the number of posts inside the Blogosphere, rather than the number of Web resources. The term "Barack Obama" has been entered in Web search engines many more times than the term "Hillary Clinton", as well as many more posts of the Blogosphere talked about Barack Obama than those about Hillary Clinton. Looking at these latter scenarios, Barack Obama should have won all the primary election contests, but he did not.

This shows that an analysis based on the simple magnitude of results (either Web resources, posts in the Blogosphere, or searches in Web search engines) may represent a distorted reality, and therefore may not be not sufficient to find the society interests.

FIG. 5 reports the TrendIndex. The period up to the end of January saw Barack Obama winning primary election contests (Iowa and S. Carolina) and getting interesting results in others (New Hampshire, Nevada, and Florida). The majority of the media defined these results as unexpected. But looking at the TrendIndex, these results were not unexpected at all. In fact, in this period the TrendIndex related to Barack Obama has been always higher than the one of Hillary Clinton, meaning that people discussed much more about Barack Obama than about Hillary Clinton.

A second interesting period to analyze is February. In that period several discussions focused on a possible withdraw of Hillary Clinton from the Presidential race. The TrendIndex shows that in February the buzz around Hillary Clinton increased a lot, and has been always higher than the TrendIndex related to Barack Obama. In the second half of March (when no primary election contests were scheduled), the buzz around the two candidates decreased. When the primary election contests begun again, the buzz of both increased, with the one about Barack Obama higher than the one of Hillary Clinton (it is to note that at the beginning of June 2008, Hillary Clinton withdraws from the Presidential race, and Barack Obama became the Democratic nominee for President of the United States). In summary, while approaches based on the simple magnitude of results were not sufficient to find the society interests, the TrendIndex better represented what was going on in society.

Example 2

FIG. 6 reports the number of Web resources talking about Barack Obama and John McCain from mid September to November 3 (the period when the battle for the Presidency become interesting).

The number of Web resources talking about Barack Obama is higher than the ones talking about John McCain. It is interesting to observe that on October 16, John McCain almost reached Barack Obama, and even passed him on October 22. Looking at what happened in society, we observe that on October 16, John McCain was a guest of the "David Letterman Show" and the video became very popular on video sharing sites like YouTube. On October 22, media talked a lot about rumors related to expenses campaign of the John McCain's Vice-President. Also to note the impact that a speech held in St. Louis on October 18 had on Barack Obama. Note also how, as of November 3, the difference among the two candidates is quite clear.

Looking at the number of Web searches, the term "Barack Obama" has been entered many more times than the term "John McCain". In the Blogosphere, the two had a comparable number of posts until mid October, and since then the difference between the two is widening with many more posts talking about "Barack Obama".

In summary, approaches based on the magnitude of results show that Barack Obama is clearly taking the lead over John McCain.

FIGS. 7-8 report the TrendIndex computed on time windows of 7 and 30 days, i.e. $z=7$ and $z=30$ in the equation (II), respectively.

FIG. 7 presents TrendIndex computed on time windows of 7 days. It can be observed that in the last month there were several turnarounds showing that one week the society is more interested in "Barack Obama" whereas the successive week the interest goes to "John McCain". This highlights the fact that the two candidates are discussed in the society in a comparable way and depending on particular events (e.g., presence on a popular TV-show, rumors about personal things) the discussion moves from one candidate to the other.

FIG. 8 presents TrendIndex computed on time windows of 30 days. Also in this investigation it can be observed that the distance between the two candidates fluctuates over time, and since October 28, the distance between the two candidate is widening.

Example 3

FIG. 9 reports the number of Web resources talking about MySpace and Facebook (the two most popular social networking sites) from the beginning of December 2007 to the end of July 2008. With the exception of the first half of December 2007, many more Web resources talk about MySpace than Facebook. Therefore, an analysis based on the simple magnitude of results would indicate that the society talks more about MySpace than Facebook. Since it is difficult to tell whether this is true or not, it is worth investigating both the number of Web searches and the Blogosphere.

Results obtained from analyzing the number of Web searches, in the same period, show that, beginning from mid April 2008, the term Facebook was much more entered in search engines than the term MySpace. Therefore, methods based on the number of Web searches would indicate that the society talks more about Facebook.

Results obtained while analyzing the sole Blogosphere show that the keyword "MySpace" appears in many more posts than the keyword "Facebook". The difference is considerable ("MySpace" appears around twice the keyword "Facebook"), but beginning from September 2008, the two keywords appear in a similar number of posts (although "MySpace" has around 20% more posts than "Facebook").

The comparison among the three analysis (the whole Web, the number of Web searches, and the Blogosphere) shows that methods based on the simple magnitude of results (either Web resources, posts in the Blogosphere, or searches in Web search engines) produce results that contradict each other, and therefore they are not suited to find the society interests.

FIG. 10 shows TrendIndex computed on time windows of 30 days (i.e., z=30 in the Equation (II) used for computing the TrendIndex). The two curves show that, beginning from February, Facebook received increasing attention from the society (a reason can be the launch of the Spanish language version of Facebook), but on June, MySpace overtook Facebook (a possible reason is that on June MySpace redesigned the site with improved TV player and start page). To summarize, this analysis shows that the society talks about "MySpace" and "Facebook" with comparable frequency, and events like redesign of the website or availability of new languages, clearly show their effects on society.

To understand whether a particular event (e.g., a commercial, an article) produces effects on society or not, it is interesting to perform the analysis using a 7 days time window (FIG. 11). The high fluctuation of the two curves is due to relative short length of the observed time windows. A length of 7 days is effective to understand whether a particular event (e.g., a commercial, an article) produces effects on society or not. Results show that beginning from February, there were frequent turnarounds. Once again, the analysis shows that "MySpace" and "Facebook" receive comparable attention by society.

The foregoing description of a specific embodiment will so fully reveal the invention according to a conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

What is claimed is:

1. Method for analyzing data from the web comprising the steps of:
    choosing a determined topic (S), said topic (S) being identified by at least one keyword;
    collecting data, or Web resources, from the Web that mention said determined topic (S) at successive instants t, two successive instants t being separated by an interval of time of determined length d;
    counting the number W(S) of said Web resources that mention said determined topic (S) at each instant t;
    generating a time-series of consecutive measures of the number of said Web resources, said time-series representing said number W(S) of Web resources as a function of time;
    splitting said time-series into a plurality of consecutive time windows of determined length z, with z≧d in such a way that each time window comprises at least one web resource among said web resources;
    applying a determined technique to said plurality of time windows for quantifying, for at least one time window among said time windows, the level of correlations Lc existing in the Web resources W(S) of a same time window T;
    estimating, for each time window, the average number $W_M(S)$ of said Web resources W(S) that mention said topic (S);
    computing, for each time window, a trend index by combining said average number of said Web resources $W_M(S)$ with said level of correlations Lc;
    repeating said computing step of said trend index for all said time windows generating a sequence of trend indexes which show how opinions that the society has on a topic S changed over time.

2. Method according to claim 1, wherein said determined technique applied to said plurality of time windows is selected from the group comprised of:
    Fractal analysis;
    Fourier transform;
    Wavelet analysis;
    Entropy analysis.

3. Method according to claim 1, wherein said determined technique applied to said plurality of time windows is Fractal analysis and said level of correlations Lc existing in the Web resources W(S) of a same time window T is expressed as a fractal Dimension D.

4. Method according to claim 1, wherein said combining step comprises a step of associating to said average number of said Web resources WM(S) and to said fractal dimension D a different weight, said associating step carried out selecting a parameter α in the range comprises between 0 and 1 depending on the importance to assign to said averaged number of Web resources $W_M(S)$ and to said fractal dimension D respectively.

5. Method according to claim 1, wherein said estimating step of said average number of Web resources of a determined time window is carried out applying the following equation:

$$W_M^i(S) = \sum \frac{W_j^i(S)}{|Ti|} \quad (I)$$

where Ti, is the $i^{th}$ time window, $W_M^i(S)$ is the average number of Web resources $W_j^i(S)$ in the $i^{th}$ time window and |Ti| is the length of the $i^{th}$ time window.

6. Method according to claim 1, wherein said computing step of said trend index is carried out applying the following equation:

$$\text{Trend}_i^z(S) = \alpha \cdot \log W_M^i(S) + (1-\alpha) \cdot D_i(S) \quad (II)$$

wherein $D_i(S)$ is the fractal dimension of the time window and α is a parameter comprised in the range between 0 and 1.

7. Method according to claim 1, wherein said collecting step of data from the Web and said counting step of said number of Web resources W(S) are automatically carried out by a computer program, or web crawler, which browses the Web at said intervals of time of length d.

8. Method according to claim 1, wherein said computing step of said fractal dimension D comprises the steps of:
    covering the curve of said time-series of data with a grid of square boxes of a determined side (L);
    recording the number M(L) of boxes needed to cover said curve as a function of said box;
    computing said fractal dimension D applying the following equation:

$$D = -\lim_{L \to 0} \log_L M(L). \quad (III)$$

9. Method according to claim 1, wherein two consecutive windows of said plurality of windows are partially overlapped.

10. Method according to claim 1, wherein said determined length z is comprised in the range between 12 hours and 60 days.

* * * * *